United States Patent
Ishida et al.

(10) Patent No.: US 9,633,286 B2
(45) Date of Patent: Apr. 25, 2017

(54) PRINTER AND RECORDING MEDIUM

(71) Applicant: Brother Kogyo Kabushiki Kaisha, Nagoya-shi, Aichi-ken (JP)

(72) Inventors: Minako Ishida, Nagoya (JP); Naoki Tanjima, Nisshin (JP); Yasunori Suzuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/065,029

(22) Filed: Mar. 9, 2016

(65) Prior Publication Data
US 2016/0267364 A1  Sep. 15, 2016

(30) Foreign Application Priority Data

Mar. 9, 2015  (JP) .................................. 2015-046137

(51) Int. Cl.
*H04N 1/04* (2006.01)
*G06K 15/02* (2006.01)
*H04N 1/00* (2006.01)

(52) U.S. Cl.
CPC ......... *G06K 15/022* (2013.01); *H04N 1/0044* (2013.01); *H04N 1/00384* (2013.01); *H04N 2201/0096* (2013.01)

(58) Field of Classification Search
CPC ...... B41J 3/4075; B41J 15/042; B41J 11/703; B41J 3/46; G06F 3/1204; G06F 3/1226; G06F 3/1284; G06F 3/0488; G06F 3/1293; G06F 3/1296; G06K 17/0025; G06K 15/024; G06K 15/4045; G06K 15/005

USPC ......... 358/1.15, 1.6, 1.2, 1.12, 1.13, 1.8, 1.9
See application file for complete search history.

(56) References Cited

U.S. PATENT DOCUMENTS

| 5,584,591 | A | 12/1996 | Mori et al. | |
|---|---|---|---|---|
| 5,649,775 | A * | 7/1997 | Sakuragi | G06F 17/214 400/61 |
| 7,616,338 | B2 * | 11/2009 | Vleurinck | B41J 3/4075 358/1.11 |
| 2013/0169728 | A1 * | 7/2013 | Tanizaki | B41J 2/355 347/192 |
| 2013/0243509 | A1 * | 9/2013 | Ishii | B41F 17/02 400/76 |

(Continued)

FOREIGN PATENT DOCUMENTS

| JP | H07-164712 A | 6/1995 |
|---|---|---|
| JP | 3111442 B2 | 11/2000 |

*Primary Examiner* — Negussie Worku
(74) *Attorney, Agent, or Firm* — Banner & Witcoff, Ltd.

(57) ABSTRACT

The disclosure discloses a printer including an operation device, a display device, and a controller. The controller executes a condition deciding process, a determining process, a first mode switching process, and a second mode switching process. In the condition deciding process, printable conditions in a length and a width direction are decided. In the determining process, it is determining whether contents after the edit operation satisfy the printable conditions. In the first mode switching process, the operation mode is switched from a real-time preview mode to a text input mode in the case that the printable conditions are not satisfied. In the second mode switching process, the operation mode is returned from the text input mode to the real-time preview mode in the case that the printable conditions are satisfied after the operation mode is switched to the text input mode.

11 Claims, 10 Drawing Sheets

(56) References Cited

U.S. PATENT DOCUMENTS

| | | | |
|---|---|---|---|
| 2014/0085670 A1* | 3/2014 | Maehira | G06F 3/121 358/1.15 |
| 2016/0107453 A1* | 4/2016 | Ishii | B41J 3/4075 347/214 |
| 2016/0267364 A1* | 9/2016 | Ishida | G06K 15/022 |
| 2016/0279975 A1* | 9/2016 | Nakagawa | B41J 11/703 |

* cited by examiner

FIRST COMPARISON EXAMPLE
FIG. 5A
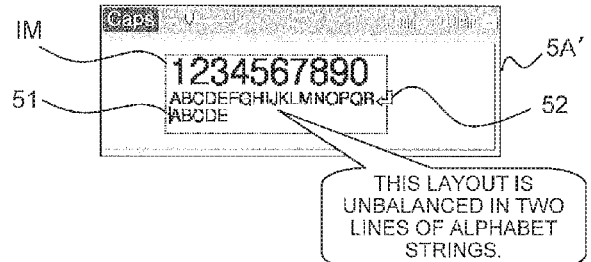
THIS LAYOUT IS UNBALANCED IN TWO LINES OF ALPHABET STRINGS.
FIG. 5B
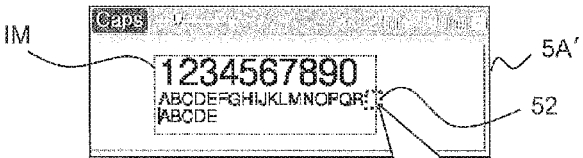
LINES OF ALPHABET STRINGS MAY BE ADJUSTED TO EQUIVALENT LENGTH BY STARTING NEW LINE AFTER "M" IN THIS WAY.
FIG. 5C
THEREFORE, NEWLINE AFTER "R" IS DELETED.
FIG. 5D
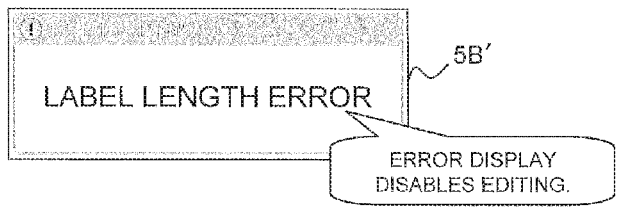
AT THAT MOMENT, PRESET LABEL LENGTH IS EXCEEDED.
FIG. 5E
LABEL LENGTH ERROR
ERROR DISPLAY DISABLES EDITING.

SECOND COMPARISON EXAMPLE

FIG. 6A

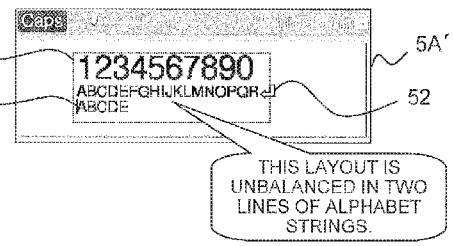

THIS LAYOUT IS UNBALANCED IN TWO LINES OF ALPHABET STRINGS.

FIG. 6B

1234567890
ABCDEFGHIJKLM
NOPQRABCDE

LINES OF ALPHABET STRINGS MAY BE ADJUSTED TO EQUIVALENT LENGTH BY STARTING NEW LINE AFTER "M" IN THIS WAY.

FIG. 6C

THEREFORE, NEW LINE IS STARTED IMMEDIATELY AFTER "M."

FIG. 6D

1234567890
ABCDEFGHIJKLM
NOPQR
ABCDE

AT THAT MOMENT, TAPE WIDTH CORRESPONDING TO TAPE OF MOUNTED CARTRIDGE IS EXCEEDED.

FIG. 6E

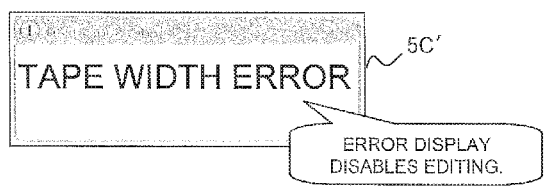

ERROR DISPLAY DISABLES EDITING.

EMBODIMENT
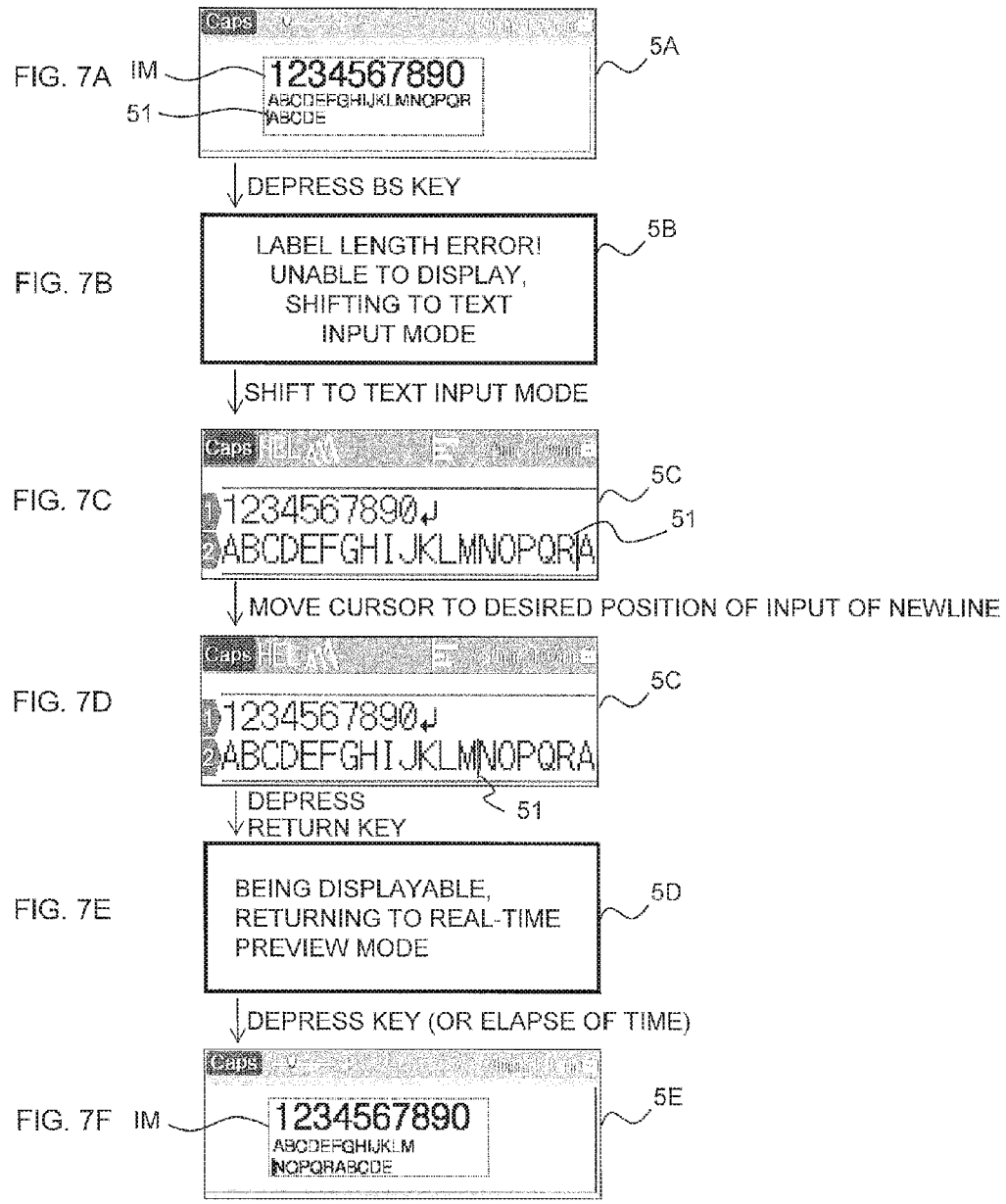

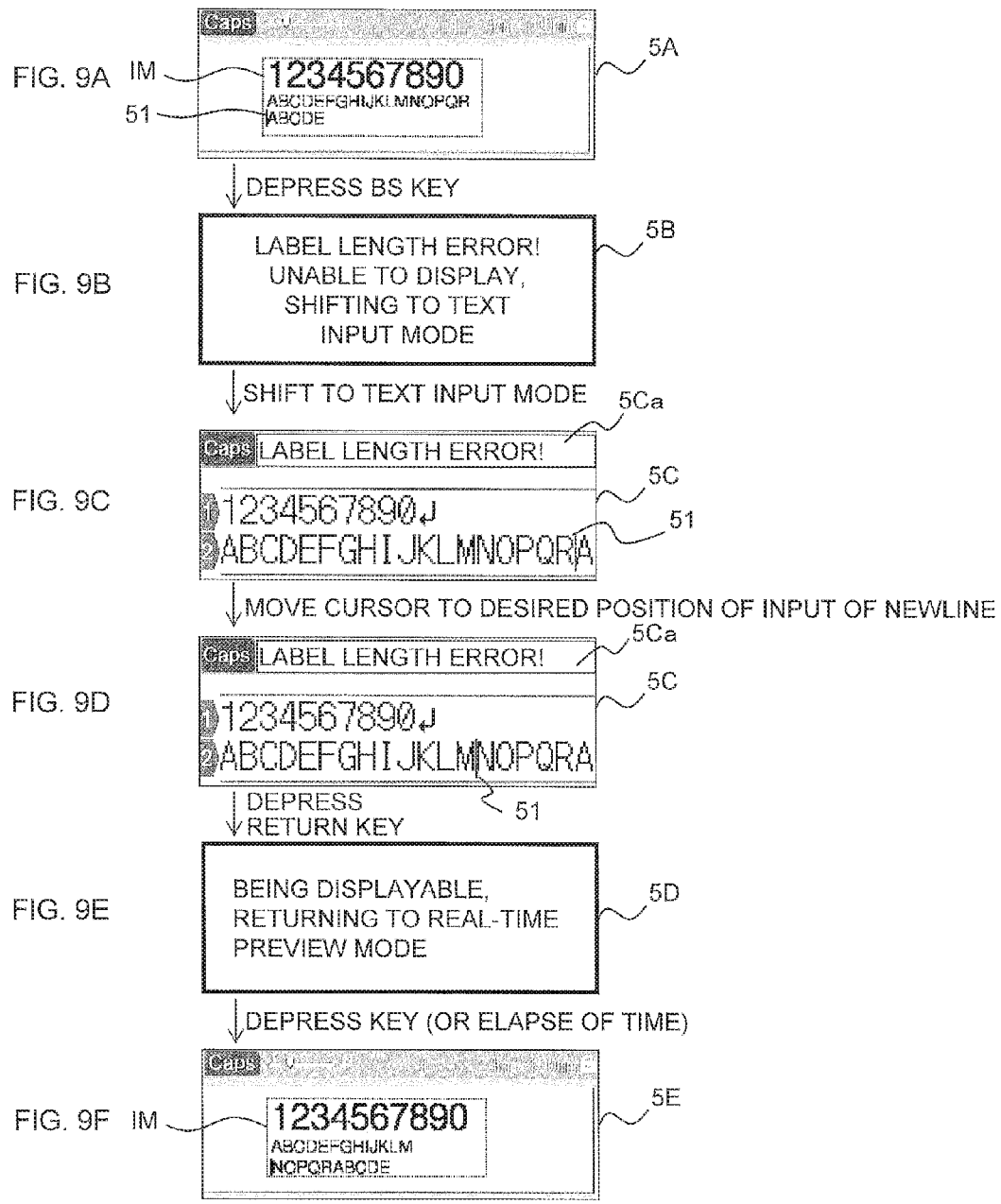

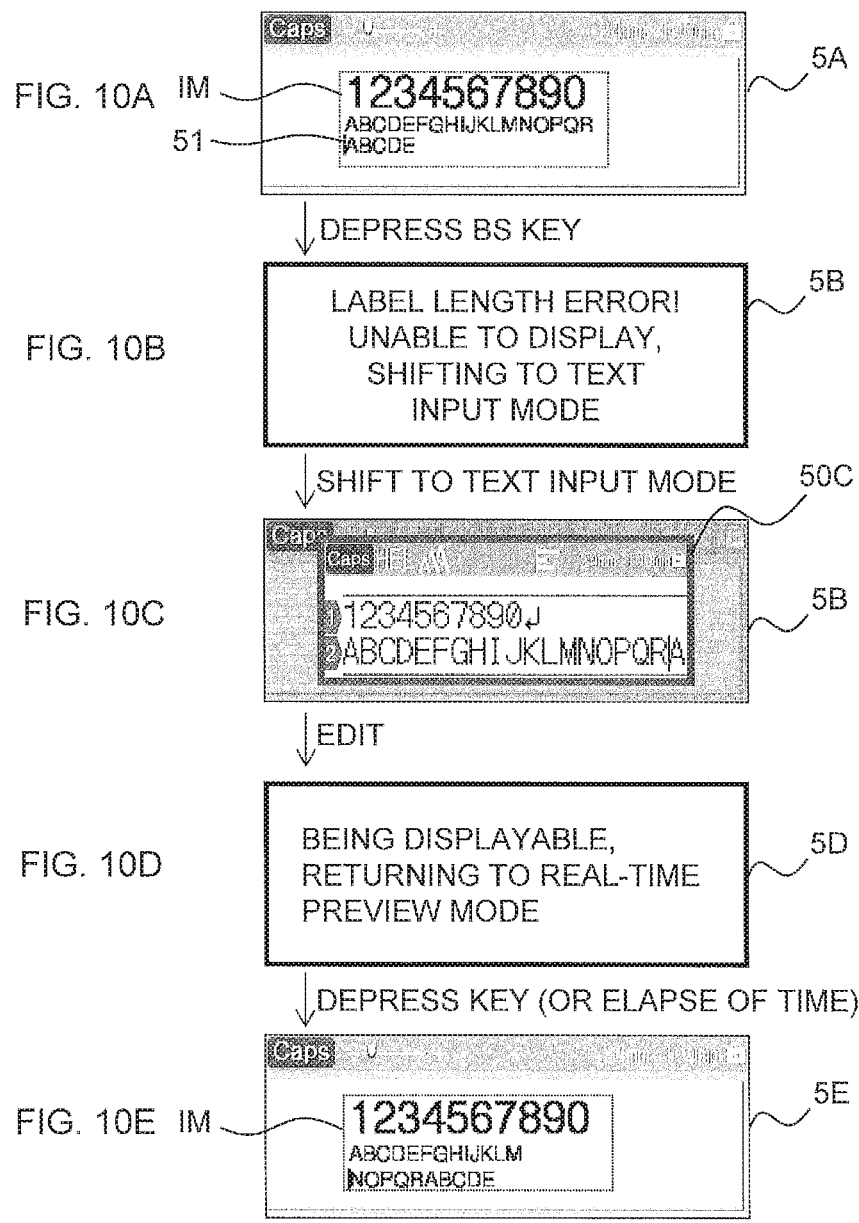

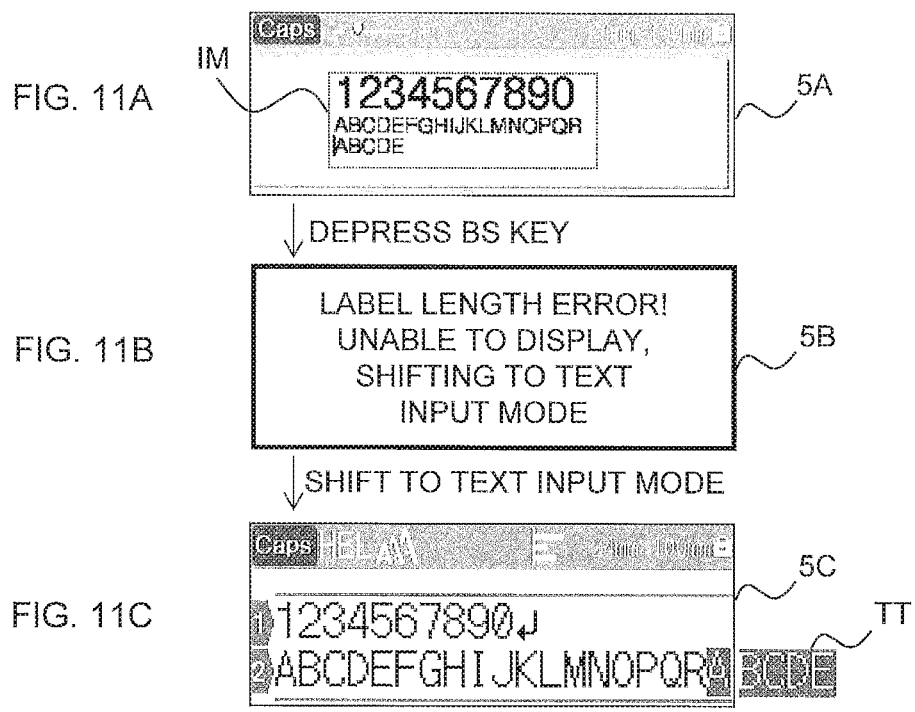

PRINTER AND RECORDING MEDIUM

CROSS-REFERENCE TO RELATED APPLICATION

The present application claims priority from Japanese Patent Application No. 2015-46137, which was filed on Mar. 9, 2015, the disclosure of which is incorporated herein by reference in its entirety.

BACKGROUND

Field

The present disclosure relates to a printer performing desired printing on a print-receiving tape and a recording medium storing a printing process program used for the same.

Description of the Related Art

A printer is known that performs desired printing on a print-receiving tape. This printer includes a real-time preview mode (print image display mode) as an operation mode. In this real-time preview mode, a display device (display) displays a preview screen representative of an appearance image of a print tape (printed tape) to be produced. Since an operator can perform an edit operation for print contents of the print tape to be produced through an operation device (keyboard) while viewing the appearance image to be printed, the printer is highly convenient.

However, the preview screen in the prior art is a screen displaying an appearance image of a print tape to be produced. Therefore, if the contents of the edit operation through the operation device turn into contents from which a print tape cannot actually be produced (e.g., in excess of the number of lines or the font size in a tape width direction dependent on a mounted tape or in excess of the number of characters in a tape length direction dependent on a preset print tape length) in the real-time preview mode, the preview screen may no longer be displayed thereafter, resulting in a trouble making a subsequent edit operation impossible.

SUMMARY

It is an object of the present disclosure to provide a printer and a recording medium storing a printing process program capable of improving operator's convenience by temporarily exiting from a real-time preview mode to enable an operator to continue an edit operation even if edit contents turn into those from which a print tape cannot be produced during the operation while maintaining the inherent convenience of the real-time preview mode that the operator can perform editing while viewing an appearance image.

In order to achieve the above-described object, according to an aspect of the present application, there is provided a printer comprising a feeder configured to feed a print-receiving tape, a printing head configured to perform a print on the print-receiving tape fed by the feeder to produce a print tape, an operation device configured to allow desired operational input to be made, a display device configured to perform a desired display, and a controller configured to switch two operation modes that are a real-time preview mode and a text input mode, the real-time preview mode being a mode of accepting an edit operation via the operation device for print contents on the print tape while displaying on the display device a preview screen representative of an appearance image of the print tape to be produced, the text input mode being a mode of accepting the edit operation via the operation device while displaying on the display device a text input screen for accepting the edit operation via the operation device for print contents on the print tape to be produced, the controller being configured to execute a condition deciding process for deciding printable conditions in a length direction and a width direction of the print-receiving tape, a determining process for determining based on an edit operation via the operation device whether contents after the edit operation satisfy the printable conditions decided in the condition deciding process, a first mode switching process for switching the operation mode from the real-time preview mode to the text input mode in the case that it is determined that the printable conditions are not satisfied in the determining process when the operation mode is the real-time preview mode, and a second mode switching process for returning the operation mode from the text input mode to the real-time preview mode in the case that it is determined that the printable conditions are satisfied in the determining process after the operation mode is switched to the text input mode in the first mode switching process.

BRIEF DESCRIPTION OF THE DRAWINGS

FIG. 5A is an explanatory view of a comparison example in which a label length error occurs during an edit operation in a real-time preview mode.

FIG. 5B is an explanatory view of the comparison example in which the label length error occurs during the edit operation in the real-time preview mode.

FIG. 5C is an explanatory view of the comparison example in which the label length error occurs during the edit operation in the real-time preview mode.

FIG. 5D is an explanatory view of the comparison example in which the label length error occurs during the edit operation in the real-time preview mode.

FIG. 5E is an explanatory view of the comparison example in which the label length error occurs during the edit operation in the real-time preview mode.

FIG. 6A is an explanatory view of a comparison example in which a tape width error occurs during an edit operation in the real-time preview mode.

FIG. 6B is an explanatory view of the comparison example in which the tape width error occurs during the edit operation in the real-time preview mode.

FIG. 6C is an explanatory view of the comparison example in which the tape width error occurs during the edit operation in the real-time preview mode.

FIG. 6D is an explanatory view of the comparison example in which the tape width error occurs during the edit operation in the real-time preview mode.

FIG. 6E is an explanatory view of the comparison example in which the tape width error occurs during the edit operation in the real-time preview mode.

FIG. 7A is an explanatory view of a screen transition example associated with an edit operation in an embodiment of the present disclosure.

FIG. 7B is an explanatory view of the screen transition example associated with the edit operation in the embodiment of the present disclosure.

FIG. 7C is an explanatory view of the screen transition example associated with the edit operation in the embodiment of the present disclosure.

FIG. 7D is an explanatory view of the screen transition example associated with the edit operation in the embodiment of the present disclosure.

FIG. 7E is an explanatory view of the screen transition example associated with the edit operation in the embodiment of the present disclosure.

FIG. 7F is an explanatory view of the screen transition example associated with the edit operation in the embodiment of the present disclosure.

FIG. 9A is an explanatory view of a screen transition example in a modification example in which error details are displayed on a text input screen.

FIG. 9B is an explanatory view of the screen transition example in the modification example in which error details are displayed on the text input screen.

FIG. 9C is an explanatory view of the screen transition example in the modification example in which error details are displayed on the text input screen.

FIG. 9D is an explanatory view of the screen transition example in the modification example in which error details are displayed on the text input screen.

FIG. 9E is an explanatory view of the screen transition example in the modification example in which error details are displayed on the text input screen.

FIG. 9F is an explanatory view of the screen transition example in the modification example in which error details are displayed on the text input screen.

FIG. 10A is an explanatory view of a screen transition example in a modification example in which the text input screen is displayed on a preview screen in an overlapping manner.

FIG. 10B is an explanatory view of the screen transition example in the modification example in which the text input screen is displayed on the preview screen in an overlapping manner.

FIG. 10C is an explanatory view of the screen transition example in the modification example in which the text input screen is displayed on the preview screen in an overlapping manner.

FIG. 10D is an explanatory view of the screen transition example in the modification example in which the text input screen is displayed on the preview screen in an overlapping manner.

FIG. 10E is an explanatory view of the screen transition example in the modification example in which the text input screen is displayed on the preview screen in an overlapping manner.

FIG. 11A is an explanatory view of a screen transition example in a modification example in which an error portion is displayed in a different form on the text input screen.

FIG. 11B is an explanatory view of the screen transition example in the modification example in which an error portion is displayed in a different form on the text input screen.

FIG. 11C is an explanatory view of the screen transition example in the modification example in which an error portion is displayed in a different form on the text input screen.

DETAILED DESCRIPTION OF THE PREFERRED EMBODIMENTS

An embodiment of the present disclosure will now be described with reference to the drawings.

Figure 1:
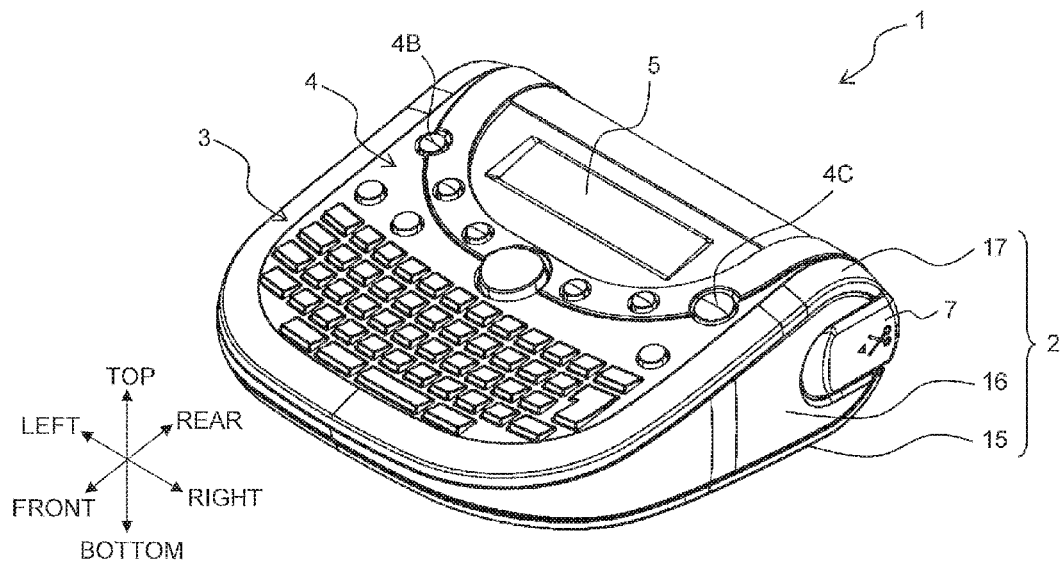
FIG. 1 is a perspective view of an exterior appearance of a printer of an embodiment of the present disclosure viewed from an obliquely upper side.

A general configuration of a printer of this embodiment will be described with reference to FIGS. 1 to 3. In FIG. 1, this printer 1 cuts a printed label tape after desired printing into a predetermined length to produce a print label (not shown. see FIG. 7 etc. described later for an appearance image) as a print tape. In this embodiment, front, back, left, right, top, and bottom of the printer 1 refer to directions shown in FIGS. 1 and 2.

<Overall General Configuration>

Figure 2:
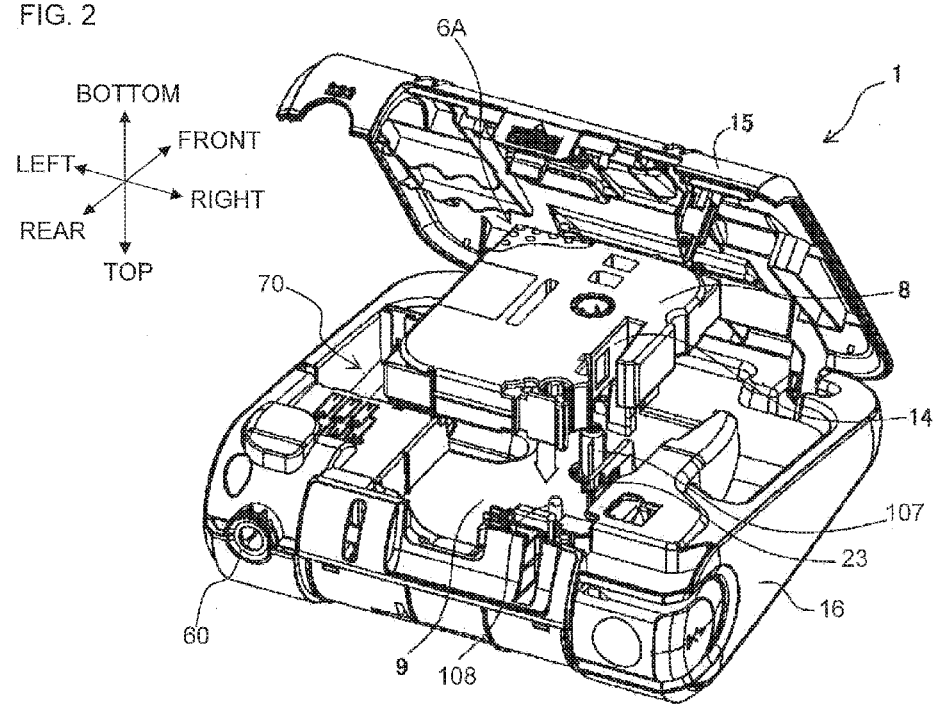
FIG. 2 is a perspective view of an exterior appearance of the printer with a bottom cover opened viewed from an obliquely lower side.

As shown in FIGS. 1 and 2, a housing 2 of the printer 1 includes a bottom cover 15 making up a printer bottom surface, a side cover 16 making up a printer side surface, and a top cover 17 making up a printer top surface. The top cover 17 is disposed with, from the front side toward the rear side, a keyboard 3 (corresponding to an operation device) for performing various operations such as character input, functional keys 4 (corresponding to the operation device) for causing the printer 1 to perform various functions, and a liquid crystal display 5 (corresponding to a display device) for displaying input characters, signs, etc. (hereinafter also referred to as print objects). The keyboard 3 is disposed with four cursor keys of "↑," "←," "→," "↓," for example, along with regular alphabet and numeric keys. In this example, the functional keys 4 include a power switch 4B, a print (Print) key 4C, etc. A cutter lever 7 for cutting a printed label tape 109 (see FIG. 3 described later) is disposed on the right rear side of the side cover 16.

The printer 1 has a cartridge holder 9 disposed on the upper rear side thereof such that the cartridge 8 is detachably mounted. This cartridge holder 9 is covered by closing the above described bottom cover 15 configured to be openable and closable by using a front end part of the printer 1 as a rotation axis and is exposed by opening the bottom cover 15.

As shown in FIG. 2, the printer 1 has a battery storage part 70 disposed on the upper rear side thereof adjacently to the cartridge holder 9 such that a plurality of batteries BT (see FIG. 4 described later) can be stored. In FIG. 2, reference numeral 60 denotes a DC jack connected to an output plug of an AC adaptor 220 (see FIG. 4 described later) acting as an external power source.

<Cartridge>

Figure 3:
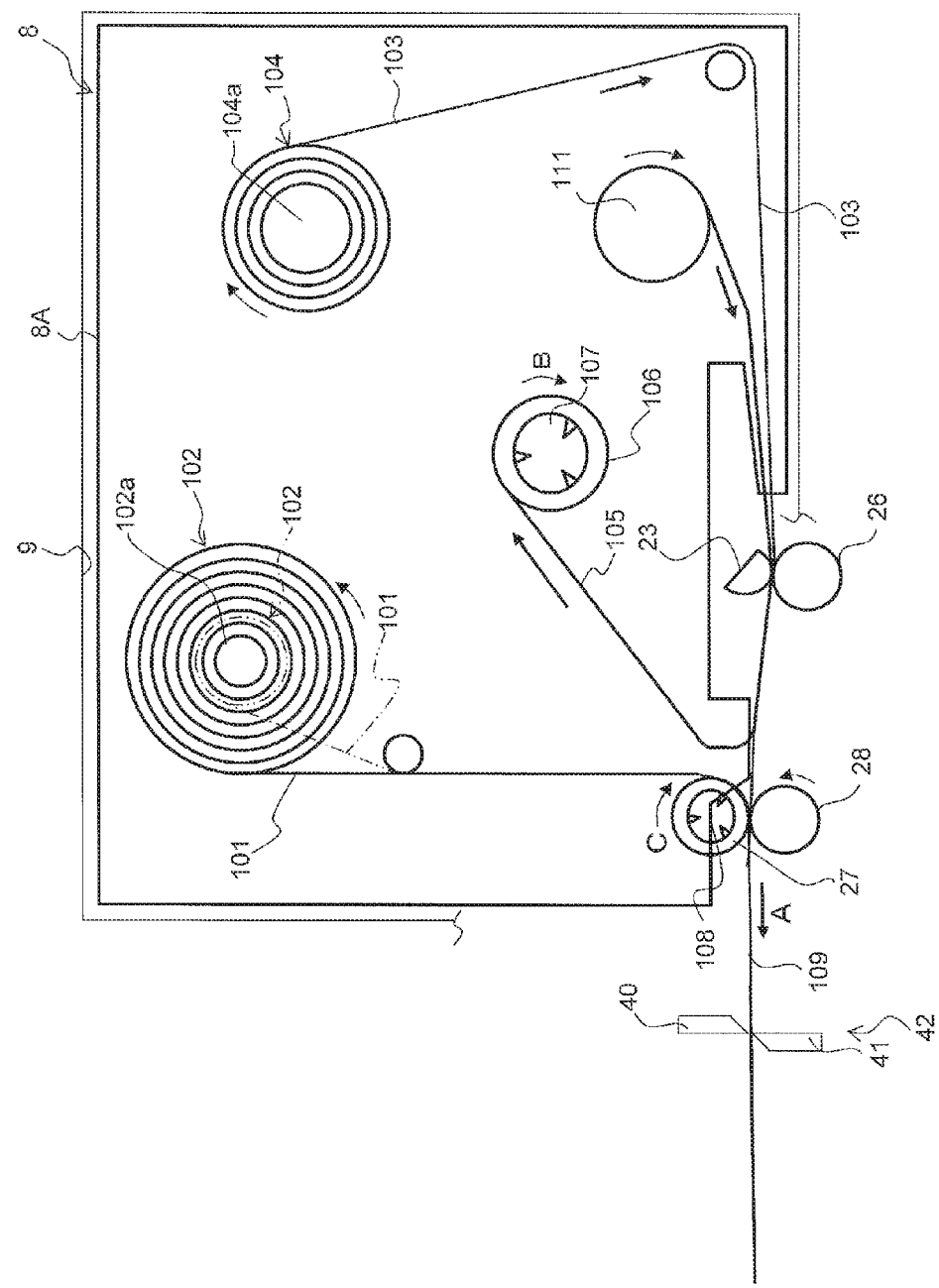
FIG. 3 is an enlarged plane view schematically showing an internal structure of a cartridge.

As shown in FIG. 3, the cartridge 8 has a housing 8A, a first roll 102 (actually having a spiral shape and simplified into a concentrically circular shape in FIG. 3) having a wound belt-shaped base tape 101 located in the housing 8A, a second roll 104 (actually having a spiral shape and simplified into a concentrically circular shape in FIG. 3) having a wound transparent cover film 103 (corresponding to a print-receiving tape) with substantially the same width as the above described base tape 101, a ribbon supply side roll 111 feeding out an ink ribbon 105 (heat transfer printing ribbon, not necessary if the print-receiving tape is a thermal tape), a ribbon take-up roller 106 taking up the ink ribbon 105 after print, and a feeding roller 27 rotatably supported in the vicinity of a tape discharging part of the cartridge 8. For example, the housing 8A of the cartridge 8 is disposed with a part to be detected 6A (see FIG. 2 described above) that is detected by a cartridge sensor 6 (see FIG. 4 described later) disposed on the housing 2 of the printer 1 when the cartridge 8 is mounted on the cartridge holder 9.

The feeding roller 27 feeds the above described base tape 101 and the above described cover film 103 in a direction indicated by an arrow A in FIG. 3 while pressing and bonding the tapes into the printed label tape 109.

The first roll 102 has the above described base tape 101 wound around a reel member 102a. The base tape 101 has a four-layer structure in this example and includes, for example, a bonding adhesive layer made of a suitable adhesive, a colored base film made of PET (polyethylene terephthalate) etc., an affixing adhesive layer made of a suitable adhesive, and a separation sheet laminated in this order from the inner wound side toward the opposite side although not shown in detail.

The second roll 104 has the above described cover film 103 wound around a reel member 104a. The ink ribbon 105 is pressed by a thermal head 23 (corresponding to a printing head) and brought into contact with a back surface of the cover film 103 fed out from the second roll 104.

Correspondingly to the above described configuration of the cartridge 8, the cartridge holder 9 is disposed with a ribbon take-up shaft 107 for taking up the above described used ink ribbon 105, and a feeding roller driving shaft 108 (corresponding to a feeder) for driving the above described feeding roller 27 for feeding the printed label tape 109. The above described thermal head 23 performing desired printing on the cover film 103 is disposed on the cartridge holder 9 such that the thermal head 23 is positioned at an opening part 14 (see FIG. 2) of the cartridge 8 when the cartridge 8 is mounted.

The ribbon take-up roller 106 and the feeding roller 27 are rotationally driven in conjunction with each other by transmitting a drive force of a drive motor 211 (see FIG. 4 described later) that is, for example, a pulse motor disposed outside the cartridge 8, via a gear mechanism not shown to the above described ribbon take-up roller driving shaft 107 and the above described feeding roller driving shaft 108.

In the above described configuration, when the cartridge 8 is mounted on the above described cartridge holder 9 and a roll holder is moved from a release position (not shown) to a print position shown in FIG. 3, the cover film 103 and the ink ribbon 105 are interposed between the above described thermal head 23 and a platen roller 26 disposed facing the thermal head 23. Additionally, the base tape 101 and the cover film 103 are interposed between the feeding roller 27 and a pressure roller 28 disposed facing the feeding roller 27. The ribbon take-up roller 106 and the feeding roller 27 are rotationally driven by the drive force of the above described drive motor in a synchronized manner in respective directions indicated by arrows B and C in FIG. 3. The feeding roller driving shaft 108 described above is coupled to the above described pressure roller 28 and the above described platen roller 26 by the gear mechanism (not shown), and the feeding roller 27, the pressure roller 28, and the platen roller 26 are rotated in accordance with the drive of the feeding roller driving shaft 108, so that the base tape 101 is fed out from the first roll 102 and supplied to the feeding roller 27 as described above.

On the other hand, the cover film 103 is fed out from the second roll 104, and a thermal head control circuit 217 (see FIG. 4 described later) energizes a plurality of heat generation elements disposed on the thermal head 23 to generate heat. In this state, the ink ribbon 105 driven by the ribbon take-up roller 106 is pressed by the above described thermal head 23 and brought into contact with the back surface side (i.e., the side to be bonded to the above described base tape 101) of the cover film 103. As a result, a print (described later in detail) corresponding to print data of desired print contents is printed on the back surface of the cover film 103.

The above described base tape 101 and the cover film 103 after completion of the above described printing are pressed by the above described feeding roller 27 and the pressure roller 28 and integrally bonded by the above described bonding adhesive layer into the printed label tape 109, which is discharged outside the cartridge 8. The ink ribbon 105 after printing onto the cover film 103 is taken up by the ribbon take-up roller 106 by driving the ribbon take-up roller driving shaft 107.

A cutting mechanism 42 including a fixed blade 40 and a movable blade 41 is disposed downstream of a transport path of the printed label tape 109 discharged outside the cartridge 8. By operating the above described cutter lever 7, the movable blade 41 is actuated to cut the above described printed label tape 109 so that the cut printed label tape 109 (hereinafter simply referred to as a print label, see FIGS. 5 to 7 for print contents) is produced.

<Control System>

A control system of the printer 1 will be described with reference to FIG. 4.

Figure 4:
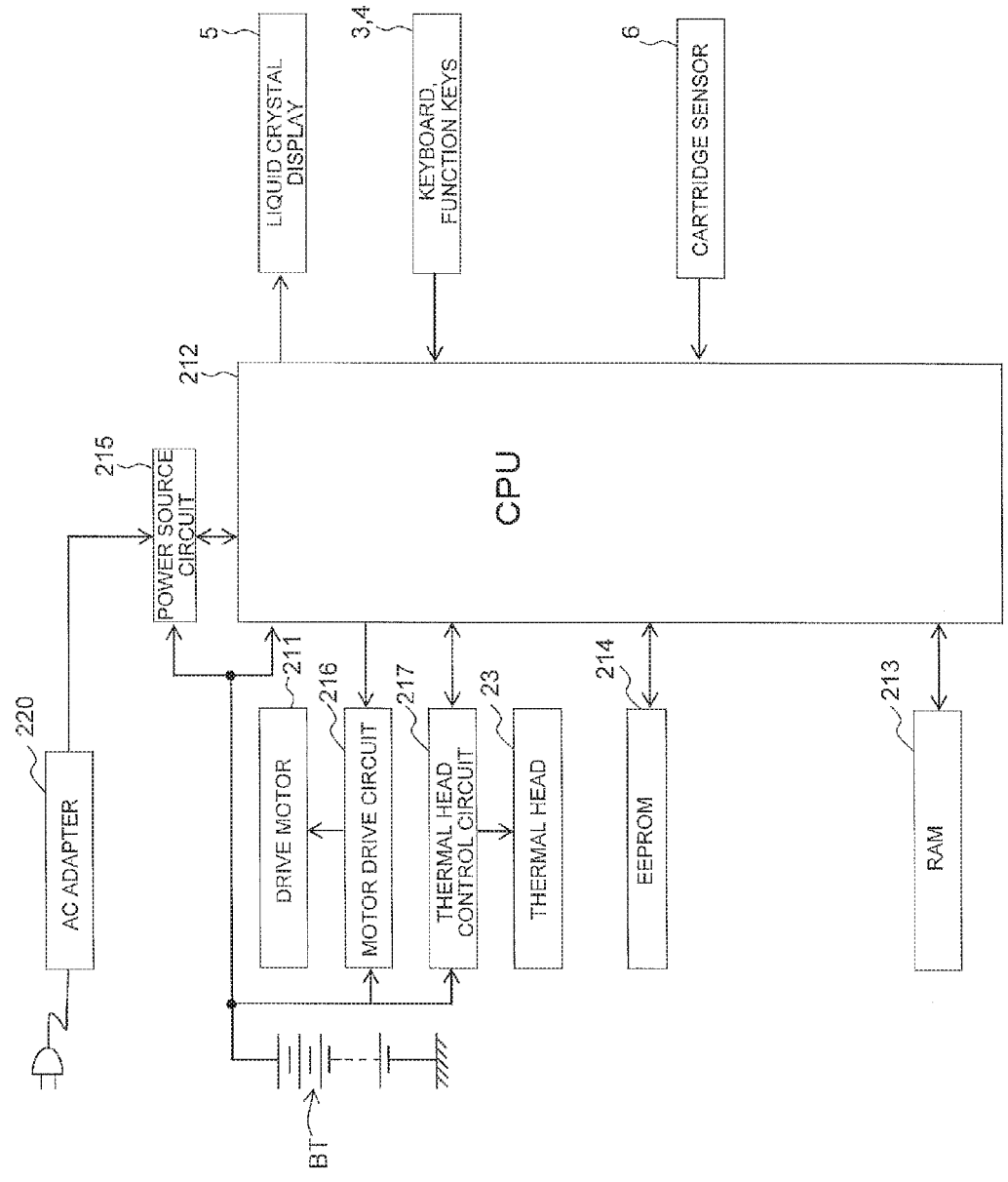
FIG. 4 is a functional block diagram of a control system of the printer.

In FIG. 4, the printer 1 has a CPU 212 (corresponding to a controller) executing a predetermined calculation.

The CPU 212 is connected to the above described liquid crystal display 5, an EEPROM 214, a RAM 213, and the cartridge sensor 6. The CPU 212 is also connected to a power source circuit 215 connected to the AC adaptor 220 to execute a process of powering on/off the printer 1, a motor drive circuit 216 carrying out drive control of the drive motor 211 driving the above described ribbon take-up roller driving shaft 107 and the above described feeding roller driving shaft 108, and the thermal head control circuit 217 carrying out energization control of the heat generation elements of the above described thermal head 23.

The EEPROM 214 stores various control programs (including a printing process program of this embodiment performing a flow of FIG. 8 etc. described later) (corresponding to a recording medium described in claims). The CPU 212 executes a signal process in accordance with a program stored in the EEPROM 214 in advance while using a temporary storage function of the RAM 213, thereby carrying out the overall control of the printer 1.

The cartridge sensor 6 detects the above described part to be detected 6A appropriately formed on the cartridge 8 etc. mounted on the cartridge holder 9, with a known technique (e.g., a mechanical contact technique or a non-contact technique using a magnetic/optical technique). Based on the detection result of the cartridge sensor 6, the CPU 212 acquires type information of the cartridge 8. This type information includes at least tape width information of the above described cover film 103 and base tape 101 included in the cartridge 8.

<Characteristic of Embodiment>

In the basic configuration described above, a characteristic of this embodiment is in a process executed when an edit operation of print objects is performed in a real-time preview mode. Details thereof will hereinafter be described in order.

<Text Input Mode and Real-Time Preview Mode>

The printer 1 of this embodiment includes two operation modes as operation modes in which the edit operation of the above described print objects can be performed. Specifically, the operation modes are a text input mode and the real-time preview mode. In the text input mode, the display 5 displays a predetermined text input screen (see FIGS. 7C, 7D, etc. described later). An operator can perform the edit operation for print contents (i.e., print objects) of a print label without particular limitation through the above described keyboard 3, the functional keys 4, etc.

On the other hand, in the real-time preview mode, the display 5 displays a preview screen representative of an appearance image of a print label to be produced (see FIGS. 5A to 5C, FIGS. 6A to 6C, FIG. 7A and 7F described later). In this display state, an operator can perform the edit operation for print contents of the print label to be produced, as is the case with the above described text input mode through the above described keyboard 3, the functional keys 4, etc.

<Trouble in Real-Time Preview Mode>

However, the preview screen displayed in the above described real-time preview mode is a screen displaying the appearance image of the print label to be produced. Therefore, the preview screen has limitations corresponding to the print label and, if the contents of the edit operation through the above described keyboard 3, the functional keys 4, etc. turn into contents from which a print tape cannot actually be produced (e.g., in excess of the number of lines in the tape width direction or in excess of the number of characters in the tape length direction) in the above described real-time preview mode, the above described preview screen may no longer be displayed thereafter, resulting in a trouble making a subsequent edit operation impossible. A specific example of such a trouble will be described with reference to FIGS. 5 and 6.

<Example of Trouble Due to Label Length Error (First Comparison Example)>

FIG. 5A shows an example of a preview screen 5A' displayed on the display 5 in the above described real-time preview mode. This preview screen 5A' displays an appearance image IM of a print label corresponding to operator's operations of the above described keyboard 3 and the functional keys 4 up to the current point of time (in other words, an appearance image of a print label possibly produced from the current operation state, hereinafter also simply referred to as a "label image"). This example has a layout including 10 numeric characters "1234567890" with a relatively large font size arranged in an uppermost line, 18 alphabetical characters "ABCDEFGHIJKLMNOPQR" with a relatively small font size arranged in a second line under the uppermost line, and 5 alphabetical characters "ABCDE" with the above described same font size arranged in a third line under the second line.

In this case, the layout shown in FIG. 5A is unbalanced since the second line "ABCDEFGHIJKLMNOPQR" is too short as compared to the third line "ABCDE". Therefore, for example, it is assumed that an operator intends to start a new line after "M" in the second line "ABCDEFGHIJKLM-NOPQR" as shown in FIG. 5B to form the second line that is "ABCDEFGHIJKLM" (13 characters) and the third line that is "NOPQRABCDE" (10 characters).

In this case, for example, as shown in FIG. 5C, the operator moves a cursor 51 to the position of "A" immediately after "R" in the above described preview screen 5A' (through operations of the above described keyboard 3 and the functional keys 4) and then deletes a newline mark 52 immediately after "R" by depressing a BS (backspace) key of the keyboard 3, for example. Although the newline mark 52 is not actually displayed on the preview screen 5A' of FIG. 5A, the mark is displayed in FIG. 5A for convenience.

However, if the newline mark 52 is deleted as described above, the character string "ABCDE" in the third line is moved to the second line including "R" and is arranged continuously after "R". Specifically, at the moment of the above described delete operation, "ABCDEFGHIJKLM-NOPQRABCDE" (23 characters) are arranged in the second line. As a result, this layout exceeds a printable condition (e.g., a range of the number of characters/the number of lines such as a certain number of characters×a certain number of lines) corresponding to, for example, a label length set and input in advance by the operator through the above described keyboard 3 and the functional keys 4 (hereinafter also simply referred to as "set label length") in the length direction (see FIG. 5D).

As described above, the preview screen 5A' is a screen representative of a label image "possibly produced" from the current operation state and therefore cannot represent a label image not satisfy the printable condition and impossible to produce as described above. As a result, as shown in FIG. 5E, the display 5 displays an error screen 5B' of "LABEL LENGTH ERROR" indicating that the printable condition based on the above described set label length is not satisfied. Therefore, subsequently, the operator cannot perform any edit operation. It is noted that the same applies to, for example, when the extremely large number of characters exceeds in the length direction a printable condition (e.g., a range of the number of characters/the number of lines such as a certain number of characters×a certain number of lines) corresponding to a print maximum length (e.g., 1 meter, hereinafter also referred to as "length limit") fixedly set independently of the above described set label length in the printer 1. In this case, the display 5 may display "LENGTH LIMIT ERROR" etc.

<Example of Trouble Due to Tape Width Error (second Comparison Example)>

An example of another error similar to the above description will be described with reference to FIGS. 6A to 6E. FIG. 6A shows the label image IM of the same preview screen 5A' as FIG. 5A, including "1234567890," "ABCDEFGHI-JKLMNOPQR," and "ABCDE" arranged in the uppermost line, the second line, and the third line, respectively, as described above.

It is assumed as described above that an operator intends to start a new line after "M" for improving the balance (see FIG. 6B) and that the operator moves the cursor 51 to the position of "M" and then inserts the newline mark 52 by, for example, depressing a return key of the keyboard 3 (see FIG. 6C). As described above, although the newline mark 52 is not actually displayed on the preview screen 5A', the mark is displayed in FIG. 6C for convenience.

However, if the newline mark 52 is inserted as described above, since the newline mark 52 (not shown) is originally inserted after a character string "OPQR" in the second line, a layout has the second line that is a character string "ABCDEFGHIJKLM," the third line that is a character string "NOPQRR," and a fourth line that is "ABCDE." As a result, this layout exceeds a printable condition (e.g., a range of the number of characters/the number of lines such as a certain number of characters×a certain number of lines) corresponding to, for example, a tape width of the cover film 103 included in the cartridge 8 mounted on the above described cartridge holder 9 (e.g., acquired by the CPU 212 based on a detection result of the cartridge sensor 6) in the tape width direction (see FIG. 6D).

As a result, as shown in FIG. 6E, the display 5 displays an error screen 5C' of "TAPE WIDTH ERROR" (or "LINE COUNT ERROR" etc.) indicating that the printable condition based on the above described tape width is not satisfied. Therefore, subsequently, the operator cannot perform any edit operation. It is noted that the same applies to, for example, when the printable condition (e.g., a range of the number of characters/the number of lines such as a certain number of characters×a certain number of lines) is exceeded in the tape width direction because the label image IM is edited to increase the font size of the characters rather than an increase in the width dimension due to insertion of the newline mark 62 as described above. In this case, the display 5 may display "CHARACTER SIZE ERROR" etc.

<Edit Process of Embodiment>

Therefore, when the printable conditions are no longer satisfied in an edit operation in the real-time preview mode as described above, the printer 1 of this embodiment temporarily switches the operation mode from the above described real-time preview mode to the above described text input mode. Details thereof will hereinafter be described with reference to FIGS. 7A to 7F.

FIG. 7A shows a preview screen 5A including the same label image IM as the preview screen 5A' of FIGS. 5A and 6A described above. The label image IM has "1234567890," "ABCDEFGHIJKLMNOPQR," and "ABCDE" arranged in the uppermost line, the second line, and the third line, respectively, as described above.

As described above, an operator intends to start a new line after "M" for improving the balance and moves the cursor 51 to the position of "A" and then depresses the BS (backspace) key of the keyboard 3. Since the resulting layout exceeds the printable condition corresponding to the above described set label length in the length direction as described with reference to FIGS. 5D and 5E, the display 5 displays an error screen 5B including a message "LABEL LENGTH ERROR! UNABLE TO DISPLAY, SHIFTING TO TEXT INPUT MODE" (corresponding to a first confirmation display) indicative of the situation. As a result, the operator is prompted to perform a confirmation operation to approve temporary switching of the operation mode from the above described real-time preview mode to the text input mode as described later.

As described with reference to FIG. 6C, for example, if the newline mark 52 is inserted immediately after "M," the display 5 displays an error screen having the message "TAPE WIDTH ERROR!" (or "LINE COUNT ERROR" etc.) in place of the above described "LABEL LENGTH ERROR!" (not shown). The same applies to the cases corresponding to "CHARACTER SIZE ERROR," "LENGTH LIMIT ERROR," etc. described above.

When the operator performs an appropriate operation in accordance with the display of the above described error screen 5B through the keyboard 3 and the functional keys 4, the above described operation mode is switched from the real-time preview mode to the text input mode, and the display on the display 5 is shifter to a text input screen 5C shown in FIG. 7C. This text input screen 5C is a screen representative of edit contents themselves (rather than an appearance image) corresponding to operations of the above described keyboard 3 and the functional keys 4 by the operator up to the current point of time as is the case with a known configuration of this type. Therefore, although arrangement of characters in each line is clearly shown, the font size, font type, decoration etc. of the characters are not reflected.

The text input screen 5C of FIG. 7C has text characters "1234567890" arranged in the first line in accordance with the display contents of FIG. 7A. In the second line, text characters "ABCDEFGHIJKLMNOPQRABCDE" are arranged horizontally in one line because of the deletion of the newline mark 52 (not shown) immediately after "R" described above (it is noted that the characters are too long to fit in the screen and are displayed by scrolling in this example). The cursor 51 is displayed immediately after "R."

In this display state, the operator intends to start a new line after "M," operates the keyboard 3 and the functional keys 4 to move the cursor 51 to the position of "M" (see FIG. 7D), and depresses the return key of the keyboard 3.

Since the above described operation eliminates the deviation from the printable condition in the length direction due to the operation of the BS key in FIG. 7A described above, the display 5 displays a screen (hereinafter also referred to as a "return notification screen") 5D including a message "BEING DISPLAYABLE, RETURNING TO REAL-TIME PREVIEW MODE" (corresponding to a second confirmation display) indicative of the situation as shown in FIG. 7E (the process by the CPU 212 in this case corresponds to a third display control process described in claims). As a result, the operator is prompted to perform a confirmation operation to approve switching of the operation mode from the above described text input mode to the above described real-time preview mode again. It is noted that, instead of a simple "operation of confirmation of switching to the real-time preview mode again," the operator may be enabled to perform an operation of selecting "whether the operation mode is switched to the real-time preview mode again" in accordance with the preference of the operator. In this case, for example, if the operator selects to disable the switching, the above described text input mode may be continued without change.

When the operator performs an operation of confirming the above described mode switching through the keyboard 3 and the functional keys 4 in accordance with the display on the above described return notification screen 5D, the above described operation mode is switched from the text input mode to the real-time preview mode and the display of the display 5 is shifted to a preview screen 5E shown in FIG. 7F (or the switching and the shifting may be triggered by an elapse of a predetermined time). As a result of the operation described above, the label image IM included in the preview screen 5E has 10 numeric characters "1234567890" arranged on the uppermost line, an alphabet string "ABCDEFGHIJKLM" (13 characters) arranged in the second line , and an alphabet string "NOPQRABCDE" (10 characters) arranged in the third line.

<Control Procedure>

Figure 8:
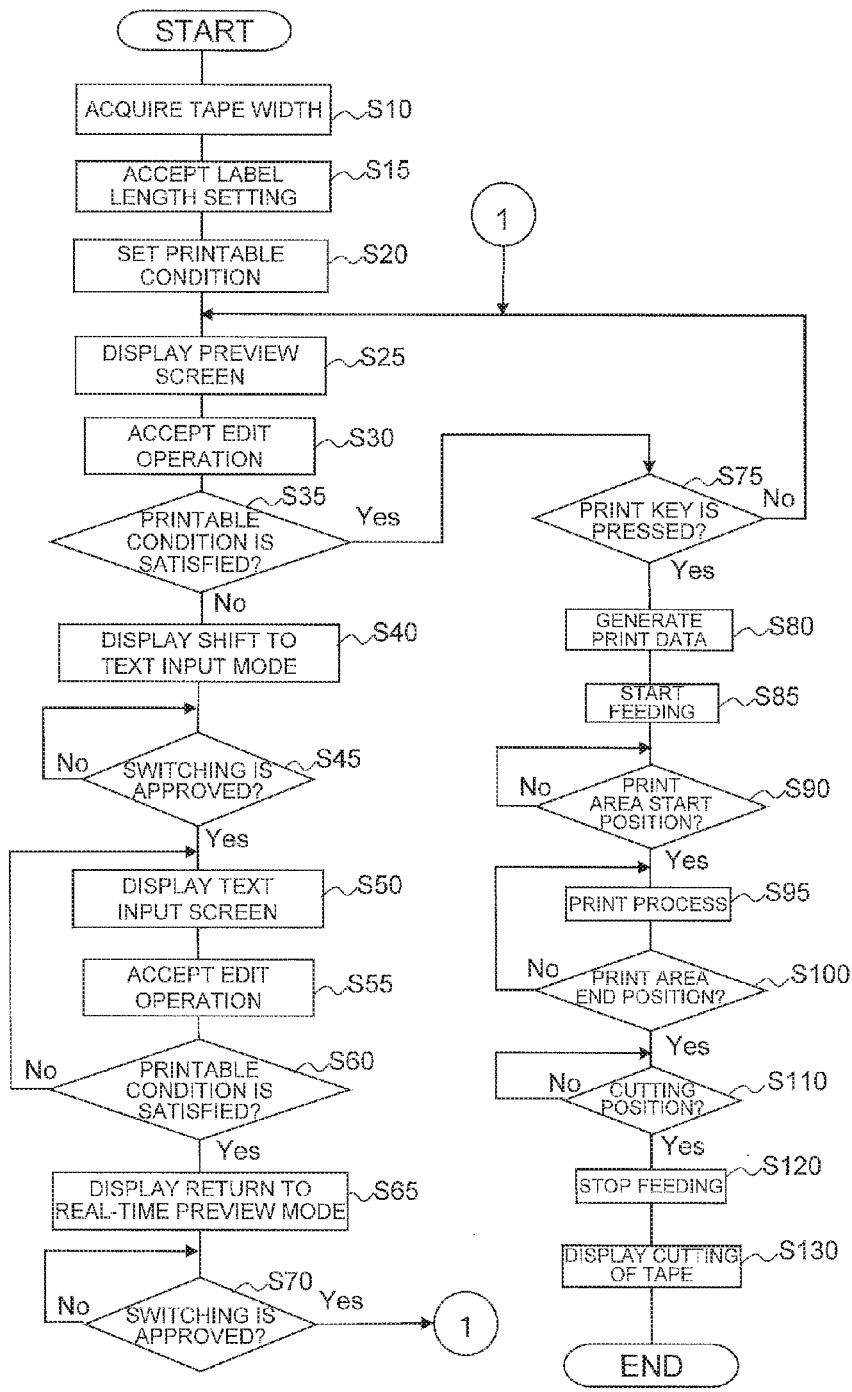
FIG. 8 is a flowchart of a control procedure executed by a CPU.

FIG. 8 shows a flow representative of a process procedure executed by the CPU 212 so as to implement the technique described with reference to FIGS. 7A to 7F.

In FIG. 8, for example, when an operator appropriately operates the above described keyboard 3, the functional keys 4, etc., to input the contents of the print objects desired to be formed as a print on a print label ("1234567890," "ABCDEFGHIJKLMNOPQR," and "ABCDE" in the example described above) in the text input mode and then further performs an appropriate operation to put the printer 1 into the real-time preview mode, this flow is started ("START" position). The above described input in the text input mode may not be performed and the input may be performed instead at step S30 described later.

First, at step S10, the CPU 212 acquires a tape width of the cover film 103 of the cartridge 8 mounted on the above described cartridge holder 9 based on a detection result of the above described cartridge sensor 6. In particular, the cartridge sensor 6 detects the above described part to be detected 6A appropriately formed on the cartridge 8 etc. mounted on the cartridge holder 9, with a known technique (e.g., a mechanical contact technique or a non-contact technique using a magnetic/optical technique). The CPU 212 acquires the type information of the cartridge 8 based on the detection result of the cartridge sensor 6 and acquires the above described tape width corresponding thereto.

Subsequently, at step S15, the CPU 212 accepts the above described label length set by the operator through an operation of the keyboard 3 and the functional keys 4.

Going to step S20, the CPU 212 sets the printable conditions described above in accordance with the above described tape width acquired at step S10 and the label length accepted at above described step S15. The printable conditions are set as, for example, a range of the number of characters (printable condition in the length direction) and a range of the number of lines (printable condition in the width direction) such as a certain number of characters×a certain number of lines. Step S20 corresponds to a condition deciding step described in claims and the process of the CPU 212 executing step S20 corresponds to a condition deciding process described in claims.

Subsequently, returning to step S25, the CPU 212 outputs a display signal to the liquid crystal display 5 to display the preview screen 5A including the above described label image IM.

Subsequently, at step S30, the CPU 212 accepts an edit operation by the operator through the keyboard 3 and the functional keys 4 (see the above described backspace key depressing operation of FIG. 7A).

Subsequently, at step S35, the CPU 212 determines whether the edited contents satisfy the above described printable conditions in the length and width directions. If the edited contents satisfy the above described printable conditions, the determination of step S35 is affirmative (S35:YES) and the CPU 212 goes to step S75 described later. If the edited contents do not satisfy the above described printable conditions, the determination of step S35 is negative (S35:NO) and the CPU 212 goes to step S40.

At step S40, the CPU 212 outputs a display signal to the liquid crystal display 5 to display the above described error screen 5B (see FIG. 7C) making a notification of shifting from the real-time preview mode to the text input mode. The process of the CPU 212 executing step S40 corresponds to a first display control process described in claims.

Subsequently, at step S45, the CPU 212 determines whether the operator performs an appropriate confirmation operation (confirmation operation of approving the mode switching) through the keyboard 3 and the functional keys 4 in accordance with the display at above described step S40. The determination of step S45 is negative (S45:NO) until the operator performs the confirmation operation, and the CPU 212 waits in a loop. If the operator performs the confirmation operation, the determination of step S45 is affirmative (S45:YES) the CPU 212 goes to step S50.

At step S50, the CPU 212 shifts the above described operation mode from the real-time preview mode to the text input mode and outputs a display signal to the liquid crystal display 5 to display the above described text input screen 5C (see FIG. 7C etc.) on the liquid crystal display 5. This shift to the text input mode enables the operator to subsequently continue the edit operation without the restrictions during the real-time preview mode. Step S50 corresponds to a first mode switching procedure described in claims, and the process of the CPU 212 shifting from above described step S45 and executing step S50 corresponds to a first mode switching process described in claims.

Subsequently, at step S55, as is the case with above described step S30, the CPU 212 accepts an edit operation by the operator through the keyboard 3 and the functional keys 4 (see the above described cursor movement and return key depressing operation of FIGS. 7C and 7D).

Subsequently, at step S60, as is the case with above described step S35, the CPU 212 determines again whether the edited contents satisfy the above described printable conditions in the length and width directions. If the edited contents satisfy the above described printable conditions, the determination of step S60 is affirmative (S60:YES) and the CPU 212 goes to step S65 described later. If the edited contents do not satisfy the above described printable conditions, the determination of step S60 is negative (S60:NO) and the CPU 212 goes to step S65. Step S60 and step S35 described above correspond to a determination procedure described in claims, and the process of the CPU 212 executing step S60 and step S35 described above corresponds to a determining process described in claims. The setting of the printable conditions (see step S20) used at steps S60 and S35 may be performed in accordance with information of formatting (font size, font type, format, decoration, etc.) for the print objects performed by the operator through the keyboard 3 and the functional keys 4. If this information of formatting is acquired by the CPU 212, the acquisition of the tape width at step S10 may not be performed. Particularly, for example, in the case of the printer 1 in which a tape width to be used is always a constant value, the printable condition may be set based on the above described information of formatting.

At step S65, the CPU 212 outputs a display signal to the liquid crystal display 5 to display the above described return notification screen 750 (see FIG. 7E) for notifying the operator of the return from the text input mode to the real-time preview mode on the liquid crystal display 5. The process of the CPU 212 executing this step S65 corresponds to a second display control process described in claims.

Subsequently, at step S70, as is the case with above described step S45, the CPU 212 determines whether the operator performs an appropriate confirmation operation (confirmation operation of approving the mode return) through the keyboard 3 and the functional keys 4 in accordance with the display at above described step S65. The determination of step S70 is negative (S70:NO) until the operator performs the confirmation operation, and the CPU 212 waits in a loop. If the operator performs the confirmation operation, the determination of step S70 is affirmative (S70:YES) and the CPU 212 returns to step S25 described above to display the preview screen 5A including the above described label image IM and subsequently repeats the same procedure. In particular, the operation mode is returned from the text input mode to the real-time preview mode. Step S25 executed after returning from step S70 corresponds to a second mode switching step described in claims and the process of the CPU 212 shifting from step S70 and executing step S25 corresponds to a second mode switching process described in claims.

On the other hand, at step S75 after the determination of above described step S35 is satisfied, the CPU 212 determines whether the print key 4C of the above described functional keys 4 is pressed. If the print key 4C is not pressed, the determination step S75 is negative (S75:NO) and the CPU 212 returns to above described step S25 to repeat the same procedure. As a result, the above described edit operation is enabled until the operator depresses the print key 4C. If the print key 4C is pressed, the determination of step S75 is affirmative (S75:YES) and the CPU 212 goes to step S80.

At step S80, the CPU 212 generates print data of energization of the heat generation elements of the above described thermal head 23 for performing the print formation corresponding to the label image IM of the preview screen (see FIG. 7F etc.) displayed on the liquid crystal display 5 at this point of time.

Subsequently, at step S85, the CPU 212 outputs a control signal to the motor drive circuit 216 to start driving the feeding roller driving shaft 108 and the ribbon take-up roller driving shaft 107 with the drive motor 211. As a result, the feeding of the cover film 103, the base tape 101, and the printed label tape 109 (hereinafter also simply referred to as the "cover film 103 etc.") is started.

At step S90, the CPU 212 determines based on the print data generated at above described step S80 whether the cover film 103 etc. fed as described above are transported to a predetermined start position of a print area (in other words, whether the cover film 103 etc. are transported in a transport direction to a position at which the printing head 23 faces a front end of the print area). This determination may be made by a known suitable technique such as counting the number of pulses of the above described drive motor 211 made up of a stepping motor, for example. If the cover film 103 etc. are not transported to the start position of the print area, the determination of step S90 is negative (S90:NO) and the CPU 212 waits in a loop until the determination of step S90 becomes affirmative. If the cover film 103 etc. are transported to the start position of the print area, the determination of step S90 is affirmative (S90:YES) and the CPU 212 goes to step S95.

At step S95, the CPU 212 executes a printing process of energizing the heat generation elements of the thermal head 23 based on the print data generated at step S80. As a result, ink of the ink ribbon 105 is transferred to the cover film 103 by the above described energized heat generation elements so as to form a print corresponding to the above described print data.

Subsequently, at step S100, the CPU 212 determines whether the cover film 103 etc. fed as described above are transported to an end position of the print area (in other words, whether the cover film 103 etc. are transported in the transport direction to a position at which the printing head 23 faces a rear end of the print area). This determination may also be made by the same known technique as described above. If the cover film 103 etc. are not transported to the end position of the print area, the determination of step S100 is not satisfied (S100:NO) and the CPU 212 returns to step S90 to repeat the same procedure. If the cover film 103 etc. are transported to the end position of the print area, the determination of step S100 is affirmative (S100:YES) and the CPU 212 goes to step S110.

At step S110, the CPU 212 determines based on the print data generated at above described step S80 whether the fed cover film 103 etc. are transported to a predetermined cutting position set on the label rear end side relative to the print area based on the above described print data (i.e., whether the printed label tape 109 is transported in the transport direction to a position at which the above described movable blade 41 faces the above described cutting position). This determination may also be made by the same known technique as described above. If the cover film 103 etc. are not transported to the cutting position, the determination of step S110 is negative (S110:NO) and the CPU 212 waits in a loop until the determination of step S110 becomes affirmative. If the cover film 103 etc. are transported to the cutting position, the determination at step S110 is affirmative (S110:YES) and the CPU 212 goes to step S120.

At step S120, the CPU 212 outputs a control signal to the motor drive circuit 216 to stop driving the feeding roller driving shaft 108 and the ribbon take-up roller driving shaft 107 by the drive motor 211. As a result, the feeding of the cover film 103, the base tape 101, and the printed label tape 109 is stopped.

Subsequently, at step S130, the CPU 212 outputs a display signal to the liquid crystal display 5. As a result, a suitable display is performed on the liquid crystal display 5, prompting the operator to operate the cutter lever 7 to actuate the cutting mechanism 15 and cut the above described printed label tape 109. When the operator operates the cutter lever 7 in accordance with this display, the printed label tape 109 is cut and the print label is produced. Subsequently, this flow is terminated.

The present disclosure is not limited to the above described embodiment and may variously be modified without departing from the spirit and the technical ideas thereof. Such modification examples will hereinafter be described in order.

(1) Case of Displaying Error Details Together at the Time of Shifting to Text Input Mode FIGS. 9A to 9E show a transition state of screen display on the display 5 in this modification example. FIGS. 9A to 9E respectively correspond to FIGS. 7A to 7E in the above described embodiment. In this modification example, as shown in FIGS. 9C and 9D, details of a generated error (corresponding to a second condition display) are displayed in a message area 5Ca on the text input screen 5C after switching from the real-time preview mode to the text input mode. In particular, the message area 5Ca displays whether a cause of the above described error (the above described unsatisfied printable condition) is the printable condition in the length direction of the cover film 103 (display of "label length error" in this example) or the printable condition in the width direction (e.g., display of "tape width error," not shown). The same applies to the cases corresponding to the "line count error," the "character size error," the "length limit error," etc. described above.

(2) Case of Displaying Text Input Screen Overlapped on Preview Screen in Covering Manner FIGS. 10A to 10E show a transition state of screen display on the display 5 in this modification example. FIGS. 10A, 10B, 10C, 10D, and 10E respectively correspond to FIGS. 7A, 7B, 7C and 7D, 7E, and 7F in the above described embodiment. In this modification example, as shown in FIG. 10C, a text input screen 50C is displayed on the above described preview screen 5B in a covering manner (or in an inserted manner such that the screens at least partially overlap each other).

At the time of shifting to the text input mode, when the text input screen 50C is displayed on the preview screen 5B in an overlapping manner as shown in FIG. 10C, the text input screen 50C may be enlarged in stages such that the screen is gradually made larger, for example. Alternatively, the display may be performed in such a manner that the screen fades in. Similarly, at the time of returning to the real-time preview mode, after the message of FIG. 10D is once displayed, the display may be returned to the state in which the text input screen 50C is overlapped on the preview screen 5B of FIG. 10C, and the text input screen 50C may be reduced in stages such that the screen is gradually made smaller and disappear, for example (or such that the display fades out).

(3) Case of Displaying Error Portion in Different Form on Text Input Screen

FIGS. 11A to 11C show a transition state of screen display on the display 5 in this modification example. FIGS. 11A, 11B, and 11C respectively correspond to FIGS. 7A, 7B, and 7C in the above described embodiment. In this modification example, as shown in FIG. 11C, the text input screen 5C displays a character string TT of "ABCDE" that is an error portion not satisfying the printable condition described above (the condition in the length direction in this example), in a display form different from the other portion (black and white reversed display in this example, alternatively, the black and white reversed display and the normal black and white display may periodically be switched). It is noted that in the case of a portion not satisfying the printable condition in the width direction described above, the portion is in a display form different from the other portion in the same way (not shown).

(4) Others

Although the printer 1 of a so-called stand-alone type is taken as an example in the above description, this is not a limitation. In particular, an operation terminal may be connected through a wired or wireless communication line to the printer 1 producing a print label, and the above described process from step S10 to step S80 of FIG. 8 may be executed by the operation terminal. In this case, when the operation terminal gives a suitable print instruction at step S75, the print data generated at step S80 is transmitted from the operation terminal to the printer 1 and the printer 1 executes the process from step S85 of FIG. 8.

The arrows shown in FIG. 4 etc. indicate an example of signal flow and are not intended to limit the signal flow directions.

The flowchart shown in FIG. 8 is not intended to limit the present disclosure to the procedures shown in the above described flow and the procedures may be added/deleted or may be executed in different order without departing from the spirit and the technical ideas of the disclosure.

The techniques of the above described embodiment and the modification examples may appropriately be utilized in combination other than those described above.

Although not exemplarily illustrated one by one, the present disclosure is implemented with other various modifications without departing from the spirit thereof.

What is claimed is:

1. A printer comprising:
   a feeder configured to feed a print-receiving tape;
   a printing head configured to perform a print on said print-receiving tape fed by said feeder to produce a print tape;
   an operation device configured to allow desired operational input to be made;
   a display device configured to perform a desired display; and
   a controller configured to switch an operation mode between a real-time preview mode and a text input mode, the real-time preview mode being a mode of accepting an edit operation via said operation device for print contents on said print tape while displaying on said display device a preview screen representative of an appearance image of said print tape to be produced, the text input mode being a mode of accepting the edit operation via said operation device while displaying on said display device a text input screen for accepting the edit operation via said operation device for print contents on said print tape to be produced,
   said controller being configured to execute:
   a condition deciding process for deciding printable conditions in a length direction and a width direction of said print-receiving tape;
   a determining process for determining based on an edit operation via said operation device whether contents after the edit operation satisfy said printable conditions decided in said condition deciding process;
   a first mode switching process for switching the operation mode from said real-time preview mode to said text input mode in the case that it is determined that said printable conditions are not satisfied in said determining process when said operation mode is said real-time preview mode; and
   a second mode switching process for returning the operation mode from said text input mode to said real-time preview mode in the case that it is determined that said printable conditions are satisfied in said determining process after said operation mode is switched to said text input mode in said first mode switching process.

2. The printer according to claim 1, wherein
   in said condition deciding process, said printable conditions are decided based on at least one of width information of said print-receiving tape and format setting information specified via an operation of said operation device.

3. The printer according to claim 1, wherein
   said controller is configured to further execute a first display control process for controlling said display device to perform a first confirmation display prompting a confirmation of switching of said operation mode from said real-time preview mode to said text input mode in the case that it is determined that said printable conditions are not satisfied in said determining process when said operation mode is said real-time preview mode, and
   in said first mode switching process, said operation mode is switched from said real-time preview mode to said text input mode in the case that a confirmation operation corresponding to said first confirmation display is performed via said operation device.

4. The printer according to claim 3, wherein
   said first confirmation display includes a first condition display of whether the unsatisfied printable condition is said printable condition in said length direction of said print-receiving tape or said printable condition in said width direction of said print-receiving tape.

5. The printer according to claim 1, wherein
   said controller is configured to further execute a second display control process for controlling said display device to perform a second confirmation display prompting a confirmation of returning of said operation mode from said text input mode to said real-time preview mode in the case that it is determined that said printable conditions are satisfied in said determining process after said operation mode is switched to said text input mode in said first mode switching process, and
   in said second mode switching process, said operation mode is returned from said text input mode to said real-time preview mode in the case that a confirmation operation corresponding to said second confirmation display is performed via said operation device.

6. The printer according to claim 1, wherein
   said controller is configured to further execute a second display control process for controlling said display device to perform a second confirmation display prompting a confirmation of returning of said operation mode from said text input mode to said real-time preview mode in the case that it is determined that said printable conditions are satisfied in said determining process after said operation mode is switched to said text input mode in said first mode switching process, and in said second mode switching process, said operation mode is returned from said text input mode to said real-time preview mode in the case that a predetermined time has elapsed after said second confirmation display is performed.

7. The printer according to claim 1, wherein
said controller is configured to further execute a third display control process for controlling said display device to perform a selection display prompting a selection of whether said operation mode is returned from said text input mode to said real-time preview mode in the case that it is determined that said printable conditions are satisfied in said determining process after said operation mode is switched to said text input mode in said first mode switching process, and in said second mode switching process,
said operation mode is returned from said text input mode to said real-time preview mode in the case that an operation of selecting a return to said real-time preview mode corresponding to said selection display is performed via said operation device.

8. The printer according to claim 1, wherein
when said operation mode is switched to said text input mode in said first mode switching process, said text input screen includes a second condition display of whether the unsatisfied printable condition is said printable condition in said length direction of said print-receiving tape or said printable condition in said width direction of said print-receiving tape.

9. The printer according to claim 1, wherein
when said operation mode is switched to said text input mode in said first mode switching process, said text input screen is displayed in an overlapping manner or in an inserted manner on said preview screen displayed before said switching.

10. The printer according to claim 1, wherein
when said operation mode is switched to said text input mode in said first mode switching process, a portion satisfying said printable conditions and a portion not satisfying said printable conditions are displayed in respective display forms different from each other in contents after said edit operation displayed on the said text input screen.

11. A non-transitory computer-readable recording medium storing printing process program for executing steps on a controller provided in a printer, the printer including a feeder configured to feed a print-receiving tape, a printing head configured to perform a print on said print-receiving tape fed by said feeder to produce a print tape, an operation device configured to allow desired operational input to be made, a display device configured to perform a desired display, and said controller configured to switch an operation mode between a real-time preview mode and a text input mode, the real-time preview mode being a mode of accepting an edit operation via said operation device for print contents on said print tape while displaying on said display device a preview screen representative of an appearance image of said print tape to be produced, the text input mode being a mode of accepting the edit operation via said operation device while displaying on said display device a text input screen for accepting the edit operation via said operation device for print contents on said print tape to be produced, said steps comprising:
a condition deciding step for deciding printable conditions in a length direction and a width direction of said print-receiving tape;
a determining step for repeatedly determining based on an edit operation via said operation device whether contents after the edit operation satisfy said printable conditions decided in said condition deciding step;
a first mode switching step for switching the operation mode from said real-time preview mode to said text input mode in the case that it is determined that said printable conditions are not satisfied in said determining step when said operation mode is said real-time preview mode; and
a second mode switching step for returning the operation mode from said text input mode to said real-time preview mode in the case that it is determined that said printable conditions are satisfied in said determining step after said operation mode is switched to said text input mode in said first mode switching step.

* * * * *